United States Patent
Fan

(10) Patent No.: US 9,958,080 B2
(45) Date of Patent: May 1, 2018

(54) VALVE APPARATUS

(71) Applicant: JDV CONTROL VALVES CO., LTD, Taoyuan (TW)

(72) Inventor: Yi-Ming Fan, Taoyuan (TW)

(73) Assignee: JDV Control Valves Co., Ltd., Taoyuan (TW)

( * ) Notice: Subject to any disclaimer, the term of this patent is extended or adjusted under 35 U.S.C. 154(b) by 308 days.

(21) Appl. No.: 14/850,261

(22) Filed: Sep. 10, 2015

(65) Prior Publication Data

US 2015/0377365 A1 Dec. 31, 2015

Related U.S. Application Data

(63) Continuation-in-part of application No. 14/048,054, filed on Oct. 8, 2013, now abandoned.

(51) Int. Cl.
  *F16K 27/06* (2006.01)
  *F16K 5/06* (2006.01)
(52) U.S. Cl.
  CPC .......... *F16K 27/067* (2013.01); *F16K 5/0642* (2013.01); *F16K 5/0689* (2013.01)
(58) Field of Classification Search
  USPC .................................................. 251/315.01
  See application file for complete search history.

(56) References Cited

U.S. PATENT DOCUMENTS

| | | | |
|---|---|---|---|
| 3,421,733 A * | 1/1969 | Stewart, Jr. | ........... F16K 5/0673 251/172 |
| 3,521,855 A | 7/1970 | Jensen | |
| 3,542,054 A * | 11/1970 | Works | ..................... F16K 5/227 137/246.22 |
| 3,598,363 A | 8/1971 | Shaw | |
| 3,635,439 A | 1/1972 | McNally | |
| 3,765,647 A * | 10/1973 | Grove | ................... F16K 3/0227 251/317 |
| 4,911,413 A | 3/1990 | Baba et al. | |
| 5,429,151 A | 7/1995 | Millett et al. | |
| 5,890,286 A | 4/1999 | Eklof | |
| 8,820,706 B2 | 9/2014 | Kawauchi et al. | |

* cited by examiner

*Primary Examiner* — Sarah B McPartlin
(74) *Attorney, Agent, or Firm* — Muncy, Geissler, Olds & Lowe, P.C.

(57) ABSTRACT

A valve apparatus of the present invention includes a body, a seat and a cap, in which the body includes a chamber and passageway therein, the chamber is connected with the passageway, and the body includes a first ladder toward the passageway. The seat is disposed in the passageway. The seat includes a second ladder toward the first ladder of the body, and the second ladder of the seat is engaged with the first ladder of the body. The seat also includes a third ladder opposite to the second ladder. The cap has a flange which is contacted with the third ladder of the seat to fix the seat in the body tightly so that the cap is against the seat to prevent the seat from pulling out of the valve apparatus.

7 Claims, 3 Drawing Sheets

VALVE APPARATUS

The present invention is a continuation-in-part of U.S. patent application Ser. No. 14/048,054, filed Oct. 8, 2013. All of the reference-application are hereby incorporated herein by reference in their entirety.

FIELD OF THE INVENTION

The present invention relates to a valve apparatus, and more particular to a seat for preventing the fluid leakage in the valve apparatus and for preventing the seat from pulling out of the valve apparatus when the seat is joined with the cap.

BACKGROUND OF THE INVENTION

Fluid flow control valves are utilized for on/off control or throttling the flow of fluid. Many such flow control valves utilizes a rotating ball control member contacting a ball seal. Such flow control devices are characterized as ball valves which can provide high fluid flow handling capacity for gases, steam, liquid and the fluid with high viscosity, and provide high flow capacity for many different applications in various process industries.

In view of the varied applications of such ball control valves, the ball seal must have wide range of temperature resistance and chemical resistance, as well as hydrolysis resistance (i.e., resistance to the long-term effects of hot water and steam). In addition, it is desired that a ball seal for such flow control valves has sufficient hardness and creep deformation, while also having a low coefficient of friction and exhibiting low air permeability, for reliable sealing without leakage.

When the valve ball is not installed correctly, the fluid in the valve body will occur leakage issue. Otherwise, when the fluid pressure within the valve apparatus is too large, the installation between the elements is not in correctly and lacks of tightness therebetween, the seat would be pulled out of the valve apparatus to damage the valve apparatus.

SUMMARY OF THE INVENTION

According to above drawback, it is an objective of the present invention to provide a seat that includes an inclined plane with a slope to contacted with the valve ball to prevent the fluid within the valve apparatus from leakage between the valve ball and the seat.

It is another objective of the present invention to provide a seat applied for the valve apparatus. One side of the seat includes a ladder to joined with the cap so as to the seat is fixed tightly in the body, Thereby, the seat can be prevented pulling out from the valve apparatus by the cap is against the seat during the operation of the valve apparatus.

To realize above objective, a valve apparatus of the present invention includes a body, a seat and a cap, in which the body includes a chamber and passageway therein, and the chamber is connected with the passageway. The body includes a first ladder toward the passageway. The seat is disposed in the passageway. The seat includes a second ladder toward the first ladder of the body, and the second ladder of the seat is engaged with the first ladder of the body. The seat also includes a third ladder opposite to the second ladder. The cap has a flange to contact with the third ladder of the seat to tightly fix the seat in the body so that the cap is against the seat to prevent the seat from pulling out of the valve apparatus.

The present invention also provides a valve apparatus, which includes a body, a valve ball, a seat and a cap. The body includes a chamber and a passageway therein and the chamber is connected with the passageway. The body includes first ladder toward the passageway. The valve ball is disposed in the chamber. The seat is disposed in the passageway, and the seat includes a second ladder toward the first ladder of the body. The second ladder of the seat is engaged with the first ladder of the body tightly, in which one side of the seat adjoining the second ladder has a sealing surface with a slope. The sealing surface is in contact with the valve ball and used to prevent the fluid within the valve apparatus from leakage between the seat and the valve ball. The cap has a flange to contact with the third ladder of the seat to tightly fix the seat in the body, and a space is between the cap and a raiser of the third ladder.

The present invention also provides a seat applied for preventing a valve apparatus from leakage. The seat includes a first ladder on a first side and an inclined plane adjoining the first ladder and contacting with the valve ball. When the inclined plane of the first ladder is contact with the valve ball tightly, the inclined plane of the first ladder is to prevent the fluid within the valve apparatus from leakage. The seat also includes a second ladder on a second side opposite to the first side of the seat, when the second ladder is engaged with a cap tightly, the cap is against the second ladder to prevent the seat from pulling out of the valve apparatus.

BRIEF DESCRIPTION OF THE DRAWINGS

The present invention will be apparent to those skilled in the art by reading the following description of a preferred embodiment thereof with reference to the drawings, in which.

DETAILED DESCRIPTION OF THE PREFERRED EMBODIMENT

Some sample embodiments of the invention will now be described in greater detail. Nevertheless, it should be recognized that the present invention can be practiced in a wide range of other embodiments besides those explicitly described, and the scope of the present invention is expressly not limited except as specified in the accompanying claims.

Figure 1:
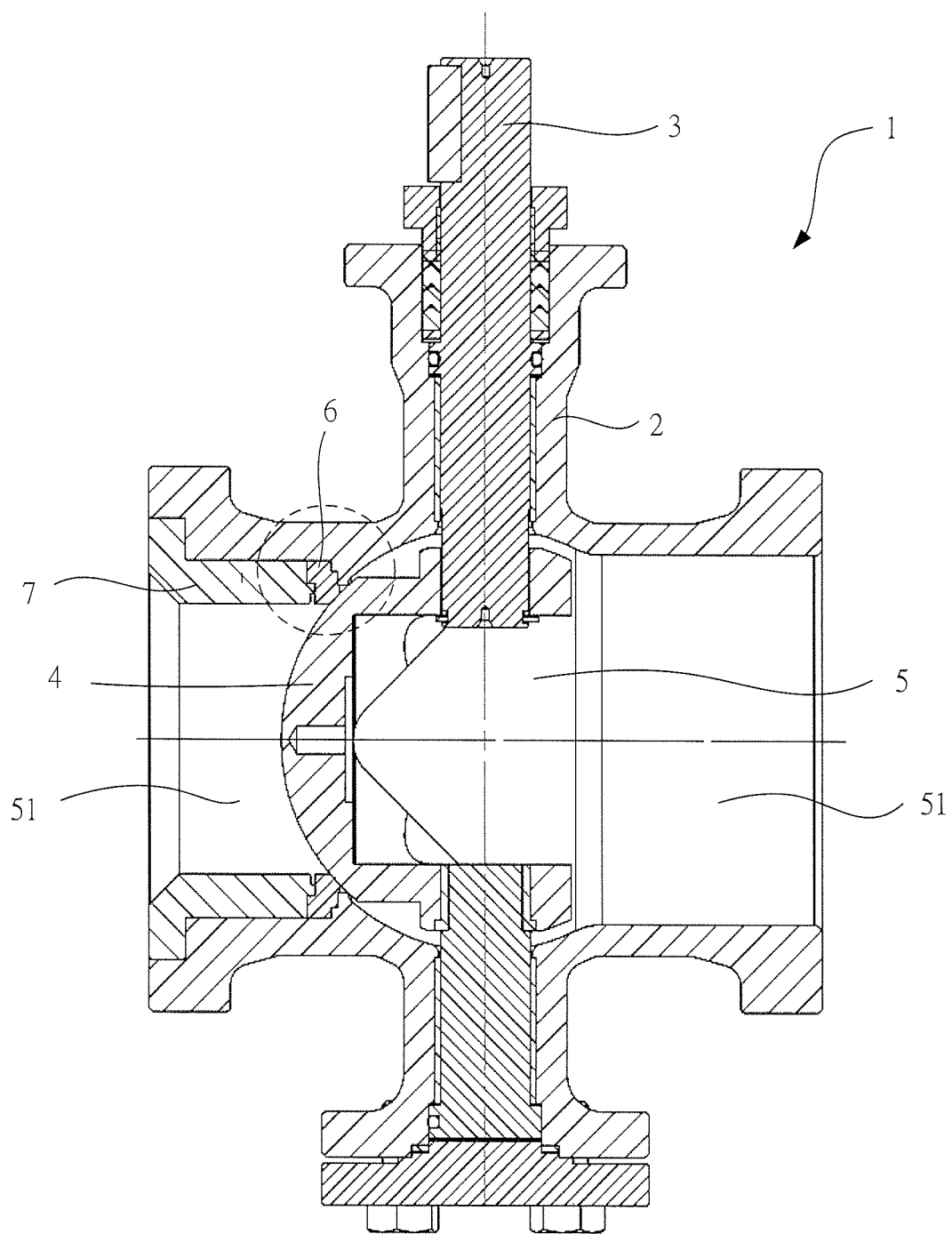
FIG. 1 is a perspective view of showing a valve apparatus in accordance with the present invention.

Please refer to FIG. 1. FIG. 1 shows a perspective view of a valve apparatus of the present invention. In FIG. 1, the valve apparatus 1 includes a body 2, a stem 3, and a valve ball 4, in which the stem 3 is disposed through into the body 2, and the valve ball 4 is disposed in the chamber, and the valve apparatus 1 can suitable for ball valve or half-ball valve (V-port), and also can applicable to room temperature, high pressure or low temperature, high pressure fluid operation, but it is not to be limited herein. It is necessary to explain that the characteristic, assemble, position relationship and the function of above structure in the valve apparatus 1 is a well-known technology, and thus it is not to be illustrated in detail herein.

Then, please still refer to FIG. 1, the body 2 of the valve apparatus 1 includes a chamber 5 and a passageway 51, and the chamber 5 is connected with the passageway 51. When the valve apparatus 1 is in off-state, the passageway 51 is not communicated with the chamber 5 as so to the fluid does not flow through the chamber 5 from the passageway 51, and the fluid is blocked in the passageway 51 and piping (not shown). When the valve apparatus 1 is in on-state, the passageway 51 is communicated with the chamber 5, the fluid is flowed from the passageway 51 to the chamber 5 to another fluid path (not shown). The seat 6 is disposed in the passageway 51 of the body 2. More specifically, a first side of the seat 6 is engaged tightly with the body 2. The cap 7 includes a flange 71 to join with a second side of the seat 6 to tightly fix the seat 6 within the body 2 and the cap 7 is against the seat 6. The detail structure of the seat 6 is described as follows.

Figure 2:
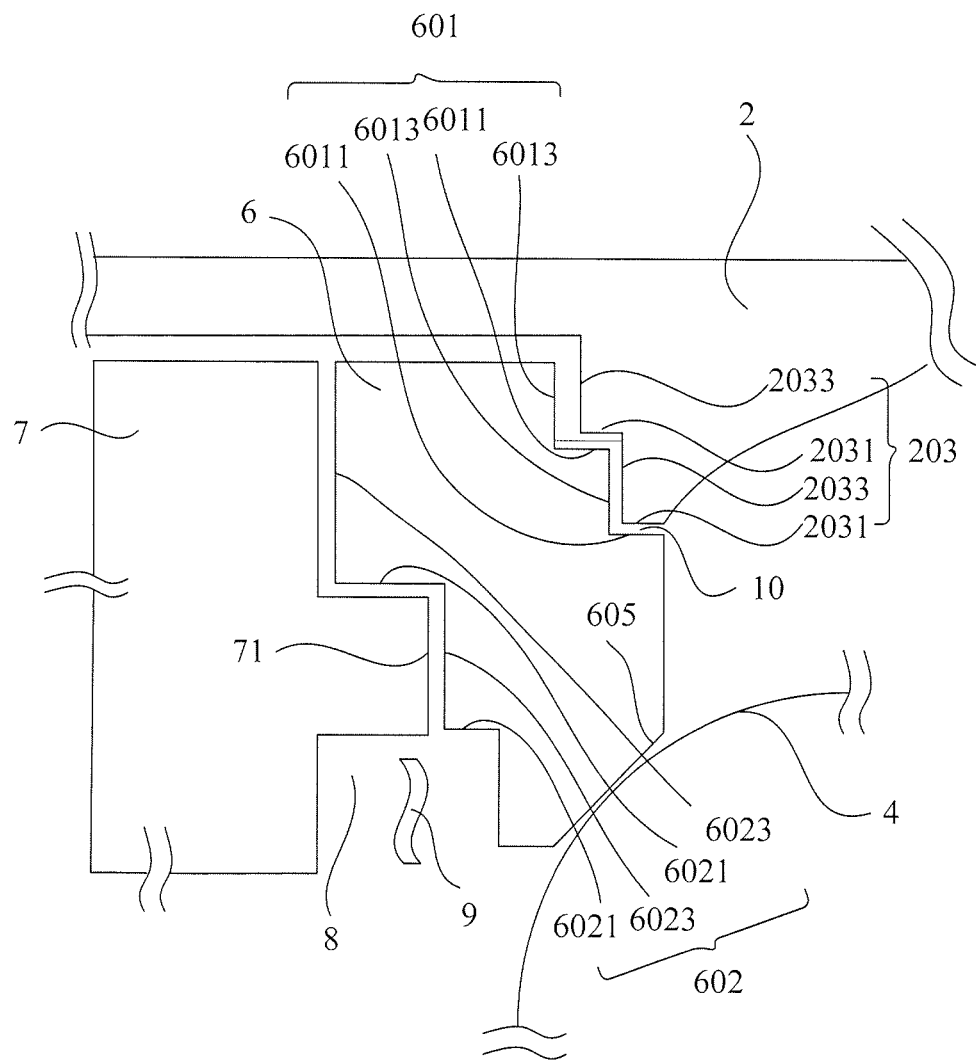
FIG. 2 is an enlarged schematic of showing the separation arrangement of the seat, the ball, the body and the cap of the valve apparatus in FIG. 1.
Figure 3:
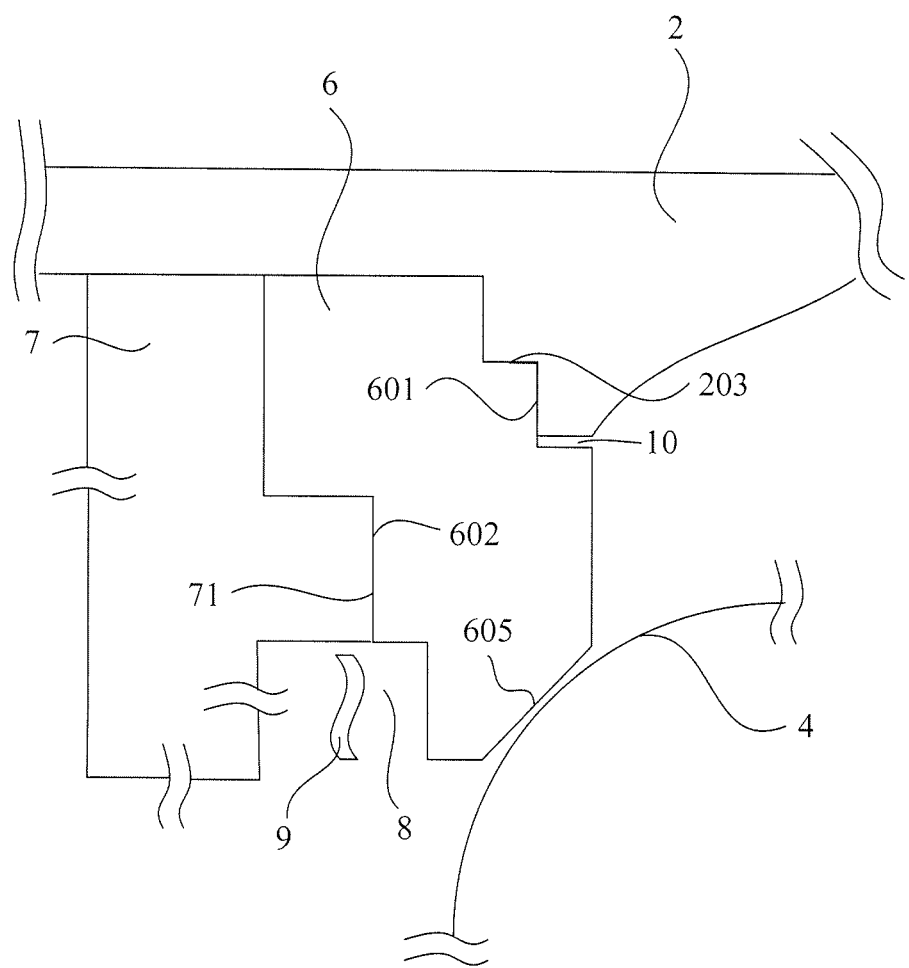
FIG. 3 is an enlarged schematic of showing the combination of the seat, the ball, the body and the cap of the valve apparatus in FIG. 2.

Please refer to FIG. 2 and FIG. 3. FIG. 2 is an enlarged view of showing the arrangement of the seat, the valve ball, the body and the cap in the valve apparatus of FIG. 1 and FIG. 3 is an exploded view of showing the combination of the seat, the valve ball, the body and the cap in the valve apparatus of FIG. 2. In the enlarged schematic of FIG. 2, in order to convenience for explanation, the arrangement of the seat 6, the valve ball 4, the body 2 and the cap 7 are separated. In fact, the valve ball 4, the body 2, the seat 6, and the cap 7 are engaged tightly together as shown in FIG. 3.

Please refer to FIG. 2 and FIG. 3. The body 2 includes a first ladder 203 toward the passageway 51. The seat 6 includes a second ladder 601 on a first side which is toward the first ladder 203 of the body 2. The second ladder 601 is engaged tightly with the first ladder 203 of the body 2, in which the first ladder 203 and the second ladder 601 is constructed by a plurality of platforms (tread surface) 2031, 6011 and a plurality of risers 2033, 6013 respectively, and each platform 2031 and each risers 2033 of the first ladder 203 are engaged with each platform 6011 and each risers 6013 of the second ladder 603 respectively. It should be to note that a gap 10 (as shown in FIG. 3) is between the first ladder 203 of the body 2 and the second ladder 601 of the seat 6. More specifically, the gap 10 is between one of the plurality of platforms 2031 of the body 2 and one of the plurality of platform 6011 of the first ladder 601 of the seat 6. The effect of the gap 10 is that the seat 6 is engaged tightly with the valve ball 4 due to the fluid pressure within the body 2, when the elements of the valve apparatus 1 are assembled. In the embodiment of the present invention, the number of the platforms of the first ladder 203 and the number of the platforms of the second ladder 601 are identical. The seat 6 is a soft seat which is made of elastic or PTFE (Polytetrafluoroethene) and so on, and the material is not to be limited in this invention.

Next, please also refer to FIG. 2 and FIG. 3. The seat 6 also includes a third ladder 602 on a second side opposite to the second ladder 601 on the first side. The third ladder 602 also constructed by a plurality of platforms 6021 and a plurality of risers 6023. The cap 7 with a flange 71 is contacted with the third ladder 602 to fix the seat 6 within the body 2. It needs to be emphasized that the cap 7 is against the third ladder 602 of the seat 6 to prevent the seat 6 from pulling out of the valve apparatus 1.

In aforementioned, for the seat 6, the number of the platforms of the second ladder 601 and the number of the platforms of the third ladder 602 are identical. In another embodiment, the number of the platforms of the second ladder 601 is larger than the number of the platforms of the third ladder 602.

Please also refer to FIG. 2 and FIG. 3. In another embodiment of the present invention, the structure of the valve apparatus 1 is the same as described above, and it is not to be described repeatedly herein. The major difference is that one side of the seat 6 adjoining the second ladder 601 includes an inclined plane 605 with a slope. The inclined plane 605 is a sealing surface. When the sealing surface 605 of the seat 6 is tightly in contactwith the valve ball 4, the sealing surface 605 of the seat 6 is tightly against the valve ball 4 so as to prevent a fluid within the valve apparatus 1 from leakage between the seat 6 and the valve ball 4.

Furthermore, the flange 71 of the cap 7 is joined with one of the riser 6023 of the third ladder 602, such that a space 8 is between the cap 7 and the other one of the riser 6023 of the third ladder 602 of the seat 6. When the valve apparatus 1 is operated at room temperature and high pressure environment, the valve ball 4 is subjected to the fluid pressure, and the space 8 is a margin space for the valve ball 4 that is moved toward the seat 6 to cushion the fluid pressure to impact the valve ball 4 and the seat 6.

In the embodiment of the present invention, a spring 9 is further disposed in the space 8 between the cap 7 and the portion of the third ladder 602. The purpose of the spring 9 is to prevent the material deformation of the seat 6 in a temperature environment so as to affect the tightness between the seat 6 and the valve ball 4. By using the spring 9 in the space 8 between the cap 7 and the portion of the third ladder 602 can increase the tightness between the seat 6 and the valve ball 4. In the present invention, the temperature is in range between 250° C.~-200° C. The spring 9 is a wave spring and is formed in one piece or a multi-piece. The material of spring 9 is carbon steel, alloy or metal, but it is not to be limited in this invention. In addition, the size and the height of the spring 9 is based on the space 8 between the cap 7 and the portion of the third ladder 602.

According to aforementioned, two ladders 601, 602 of the seat 6 with engagement function to engage tightly the body 2 and the cap 7 respectively, such that when the valve apparatus 1 is operated, the cap 7 is against one side of the seat 6 to tightly fix the seat 6 within the passageway 51 to prevent the seat 6 from pulling out of the valve apparatus 1 and the fluid leakage between the seat 6, the body 2 and the cap 7 is to be decreased within the valve apparatus 1. Since one side of the seat 6 adjoining the ladder 601 of the seat 6 includes an inclined plane 605 with a slope and the inclined plane 605 is in contact with the valve ball 4, the inclined plane 605 is used to prevent the fluid leakage between the valve ball 4 and the seat 6 in the body 2 to avoid that the valve apparatus 1 is to be damaged or the valve apparatus is not to be operated. Accordingly, the issue of the conventional prior art is that the seat 6 is pulled out of the valve apparatus 1 at high pressure environment and/or the fluid leakage within the valve apparatus 1 can be improved by the seat 6 with ladders on two sides of the present invention.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A valve apparatus, comprising:
   a body having a chamber, a passageway connecting with the chamber, and a first ladder disposed toward the passageway;
   a valve ball disposed in the chamber;
   a seat disposed in the passageway, the seat having a second ladder on a first side of the seat and toward the first ladder of the body, the seat having a third ladder on a second side opposite to the first side, and the second ladder of the seat being tightly engaged with the first ladder of the body, wherein one side of the seat adjoining the second ladder includes a sealing surface with a slope and the sealing surface is in contact with the valve ball, the sealing surface is used to prevent a fluid in the valve apparatus from leakage between the seat and the valve ball; and a cap having a flange which is contacted with the third ladder of the seat to tightly fix the seat in the body and a space is between the cap and a riser of the third ladder.

2. The valve apparatus according to claim 1, wherein the first ladder and the second ladder have an identical number of platforms.

3. The valve apparatus according to claim 1, wherein the second ladder has a larger number of platforms than the third ladder has.

4. The valve apparatus according to claim 1, further comprising a spring disposed in the space between the cap and the riser of the third ladder.

5. The valve apparatus according to claim 4, wherein the spring is a wave spring.

6. The valve apparatus according to claim 5, wherein the wave spring is formed in one piece or in multiple pieces.

7. The valve apparatus according to claim 1, wherein a gap is disposed between a platform of the first ladder of the body and a platform of the second ladder of the seat.

* * * * *